(12) United States Patent
Cowan et al.

(10) Patent No.: US 8,020,386 B2
(45) Date of Patent: Sep. 20, 2011

(54) ROLLERTRACK PIVOTING AXI-NOZZLE

(75) Inventors: Curtis C. Cowan, E. Hampton, CT (US); Robert H. Bush, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1303 days.

(21) Appl. No.: 11/894,314

(22) Filed: Aug. 21, 2007

(65) Prior Publication Data

US 2009/0065610 A1 Mar. 12, 2009

(51) Int. Cl.
*F02K 1/12* (2006.01)

(52) U.S. Cl. ...................................... 60/771; 239/265.39

(58) Field of Classification Search .................... 60/230, 60/232, 771; 239/265.33, 265.35, 265.37, 239/265.39, 265.41
See application file for complete search history.

(56) References Cited

U.S. PATENT DOCUMENTS

| | | | |
|---|---|---|---|
| 3,807,637 A | 4/1974 | Camboulives et al. | |
| 3,814,325 A | 6/1974 | McCardle, Jr. et al. | |
| 4,043,509 A | 8/1977 | McHugh et al. | |
| 4,049,199 A * | 9/1977 | Nightingale | 239/265.39 |
| 4,141,501 A * | 2/1979 | Nightingale | 239/265.39 |
| 4,245,787 A | 1/1981 | Freid | |
| 4,310,121 A | 1/1982 | Basinski, Jr. | |
| 4,313,581 A * | 2/1982 | Folmer et al. | 239/265.33 |
| 4,447,009 A * | 5/1984 | Wiley et al. | 239/265.39 |
| 4,456,178 A | 6/1984 | Jones et al. | |
| 4,799,623 A | 1/1989 | Bruchez, Jr. et al. | |
| 4,819,876 A | 4/1989 | Thayer | |
| 4,993,641 A | 2/1991 | Kehret et al. | |
| 5,150,839 A | 9/1992 | Reedy | |
| 5,269,466 A * | 12/1993 | Maguire | 239/265.39 |
| 5,364,029 A | 11/1994 | Barcza | |
| 5,398,499 A | 3/1995 | Urruela | |
| 5,494,221 A * | 2/1996 | Cot et al. | 60/230 |
| 5,797,544 A | 8/1998 | Ward | |
| 5,813,611 A | 9/1998 | Cires et al. | |
| 6,398,129 B1 | 6/2002 | Johnson | |
| 6,779,336 B2 | 8/2004 | Allore et al. | |
| 7,032,835 B2 | 4/2006 | Murphy et al. | |
| 7,096,661 B2 | 8/2006 | Bush et al. | |
| 7,174,704 B2 | 2/2007 | Renggli | |

\* cited by examiner

*Primary Examiner* — Ted Kim

(74) *Attorney, Agent, or Firm* — Kinney & Lange, P.A.

(57) ABSTRACT

A mechanism included in a convergent-divergent nozzle connected to an aftward portion of a gas turbine engine, which mechanism includes at least one actuator configured to be connected to the aftward portion of the engine and to move through one or more positions, a first link pivotally connected to the at least one actuator, a convergent flap pivotally connected to the first link, a divergent flap rotatably connected to the convergent flap and configured to be kinematically connected to an annular ring connected to the at least one actuator, and at least one track configured to extend from the aftward portion of the engine and to movably and pivotally receive the pivotal connection between the convergent flap and the first link.

19 Claims, 4 Drawing Sheets

ROLLERTRACK PIVOTING AXI-NOZZLE

BACKGROUND

The present invention relates to convergent-divergent nozzles used in gas turbine engines. In particular, the present invention relates to convergent-divergent nozzles with a floating area ratio.

Prior gas turbine engines have, in some configurations, included exit nozzles attached to the aft end of the engine. Exit nozzles are commonly employed to produce additional thrust for the engine by accelerating the working medium gas, for example air, leaving the aft end of the main engine, for example via the low pressure turbine, through the nozzle. Exit nozzles accelerate the air leaving the engine, and therefore produce useful thrust, by prescribing the nozzle area for particular exit pressures inside the nozzle. One such exit nozzle is the variable convergent-divergent nozzle. Prior variable convergent-divergent nozzles commonly include convergent-divergent flap sets arranged circumferentially about the main axis of the engine to form a substantially circular annular nozzle extending aft of, for example, the low pressure turbine. The convergent-divergent flap sets are commonly connected to an annular ring, sometimes referred to as a sync ring, which is in turn connected to an engine casing. The convergent flap in each of the convergent-divergent flap sets declines generally toward the main axis of the engine as the flap extends aftwardly. The divergent flap in each of the convergent-divergent flap sets may be rotatably connected to the convergent flap and inclines generally away from the main axis of the engine as the flap extends aftwardly. The circumferentially arranged convergent-divergent flap sets therefore form an annular nozzle whose cross-sectional area decreases from the forward end of the nozzle to a throat generally defined by the pivotal connection between the convergent and divergent flaps and then increases from the throat to the nozzle exit.

In order to operate efficiently, variable convergent-divergent nozzles are configured to position the convergent and divergent flaps, and thereby the annular area of the entire nozzle, to optimize engine performance for different operating conditions. The position of the convergent and divergent flaps, and thereby the annular shape of the nozzle is commonly represented by the ratio of the cross-sectional area of the nozzle at the exit ($A_E$) divided by the cross-sectional area of the nozzle at the throat ($A_T$), or $A_E/A_T$. The nozzle pressure ratio (NPR) is equal to the total pressure at the nozzle throat ($P_T$) divided by the ambient pressure ($P_{Amb}$), or $NPR=P_T/P_{Amb}$. Convergent-divergent nozzles function generally by assigning $A_E/A_T$ for critical flight conditions (NPR) in order to produce useful thrust by extracting as much energy as is practicable from the working medium gas flowing through the nozzle.

Prior variable convergent-divergent nozzles have used various means to vary the position of the convergent and divergent flaps for different engine conditions. For example, some prior convergent-divergent nozzles have mechanically prescribed the position of the convergent and divergent flaps through a kinematic mechanism driven by one or more actuators to tune $A_E/A_T$ for specific engine conditions. Prior convergent-divergent nozzles have also employed kinematics that vary $A_E/A_T$ with respect to $A_T$ to achieve improved performance at multiple engine operating conditions. This arrangement allows for a single valued $A_E/A_T$ for all $A_T$ without the weight and complexity of independently controlling $A_E/A_T$. Other prior convergent-divergent nozzles have employed a toggling configuration triggered by the pressure inside the nozzle, which acts to position the divergent flaps for low and high $A_E$ respectively (low and high mode). Nozzles employing such a toggling configuration are considered to have two available values of $A_E$ for each $A_T$. At low $A_T$, which is typical of aircraft cruise and low values of NPR, a low value of $A_E/A_T$ is desirable. At relatively high values of $A_T$ a higher value of $A_E/A_T$ is desirable, which corresponds to conditions associated with aircraft acceleration. Thus the low mode (low $A_E/A_T$) condition corresponds to relatively low values of NPR and high mode (higher $A_E/A_T$) corresponds to relatively high values of NPR.

Prior variable convergent-divergent nozzles have several disadvantages with respect to $A_E/A_T$. In prior nozzles independently controlling $A_T$ and $A_E$, one disadvantage is weight and complexity (design and control). For scheduled (single valued) $A_E/A_T$ nozzles, one disadvantage is an inability to run optimally at low and high NPR (cruise and acceleration) at a fixed $A_T$. More generally, prior nozzle designs have varied the nozzle geometry to optimally position the convergent and divergent flaps at low mode and high mode, but have failed to vary the convergent and divergent flaps position through an intermediate mode of engine operation between low and high modes. Therefore, prior nozzle configurations have failed to advantageously position the convergent and divergent flaps for a substantial number of NPR values encountered during engine operation, thereby causing sub-optimal engine performance at many of the NPR values encountered.

SUMMARY

The present invention includes a mechanism included in a convergent-divergent nozzle connected to an aftward portion of a gas turbine engine, which mechanism comprises at least one actuator configured to be connected to the aftward portion of the engine and to move through one or more positions, a first link pivotally connected to the at least one actuator, a convergent flap pivotally connected to the first link, a divergent flap rotatably connected to the convergent flap and configured to be kinematically connected to an annular ring connected to the at least one actuator, and at least one track configured to extend from the aftward portion of the engine and to movably and pivotally receive the pivotal connection between the convergent flap and the first link.

DETAILED DESCRIPTION

Figure 1:
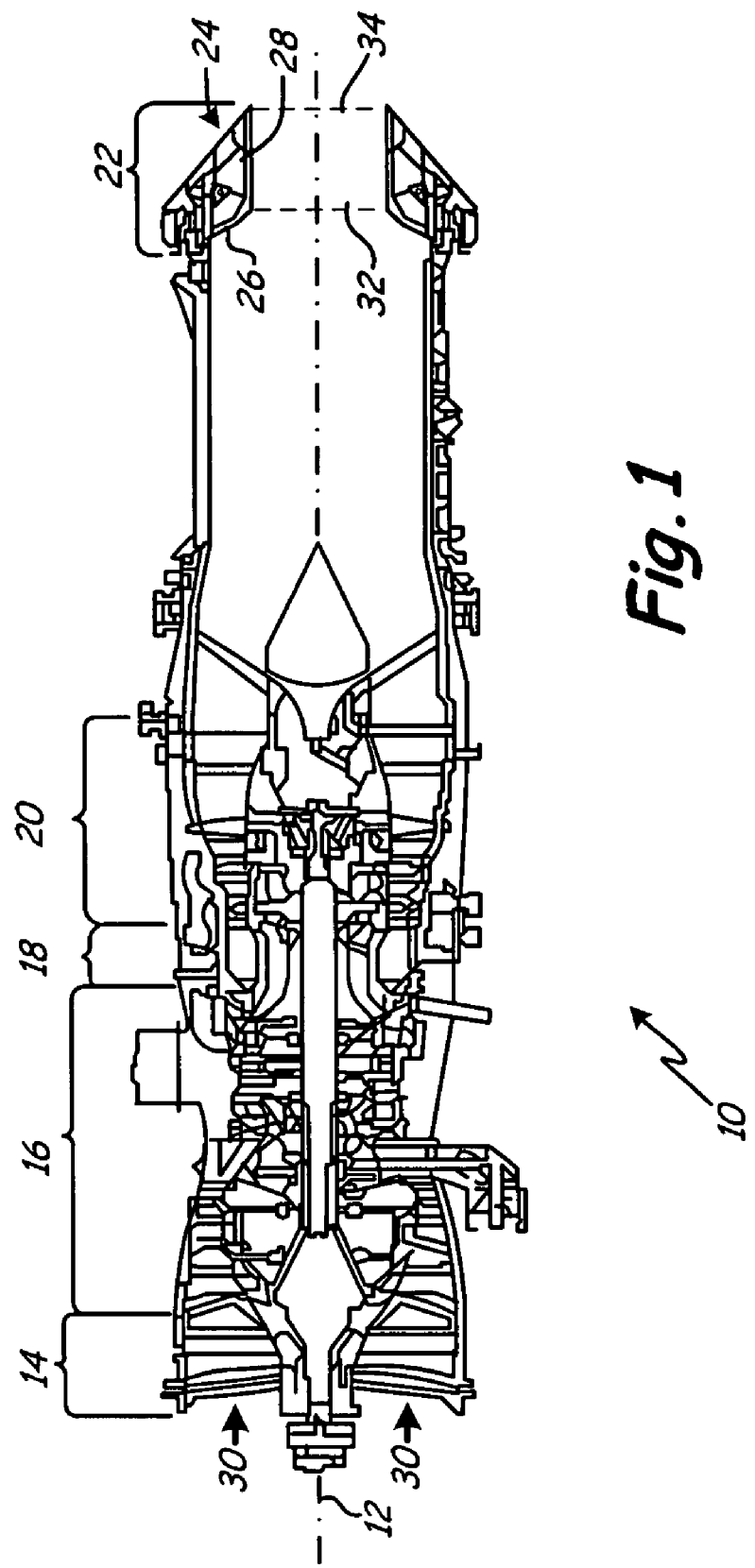
FIG. 1 is an axial section view of a gas turbine engine including a variable convergent-divergent nozzle according to the present invention.

FIG. 1 is an axial section view of gas turbine engine 10 including engine axis 12, fan 14, compressor 16, combustion section 18, turbine 20, and variable convergent-divergent nozzle 22. Nozzle 22 includes a plurality of mechanisms 24, which mechanisms 24 include a plurality of convergent flaps 26 and divergent flaps 28 circumferentially arranged around engine axis 12. During operation of engine 10, working medium gas stream 30, for example a stream of air, is pulled into the front of engine 10 by fan 14, by the rotation of fan blades about axis 12. Fan 12 directs a portion of gas stream 30 into compressor 16. Working medium gas 30 is successively compressed through stages of compressor 16 and directed into combustor section 18. In combustor section 18, gas stream 30 is mixed with fuel and ignited. The gas and fuel mixture ignited in combustor section 18 is directed into turbine 20 in which the mixture is successively expanded. A portion of the energy of the gas and fuel mixture expanded through turbine 20 powers fan 14 and compressor 16 through co-joined shafting. The remaining portion of the energy of the gas and fuel mixture expanded through turbine 20 exits the back of engine 10 through nozzle 22 to produce useful thrust for engine 10. In some embodiments of the present invention, nozzle 22 including mechanisms 24, instead of being connected to an aftward portion of gas turbine engine 10, may be connected directly to the aircraft to which engine 10 is mounted.

Nozzle 22 augments the thrust produced by the gas and fuel mixture expanded through turbine 20 by accelerating the gas and fuel mixture through the exit of engine 10. Nozzle 22 accelerates the gas and fuel mixture leaving the engine, and thereby produces additional thrust, by prescribing the nozzle area for particular exit pressures inside the nozzle. Specifically, nozzle 22 in FIG. 1 includes convergent and divergent flaps 26, 28 circumferentially arranged to form a generally circular annular nozzle 22. The aft end of convergent flaps 26 are rotatably connected to the forward end of divergent flaps 28. The cross-sectional area of nozzle 22 decreases from the forward end of convergent flaps 26 to nozzle throat 32 defined by a plane perpendicular to engine axis 12 and passing through the connection between convergent and divergent flaps 26, 28. From nozzle throat 32, the cross-sectional area of nozzle 22 increases toward engine exit 34. Nozzle 22 accelerates the gas and fuel mixture leaving turbine 20 by prescribing the ratio of the area of nozzle 22 at engine exit 34 ($A_E$) divided by the area of nozzle 22 at nozzle throat 32 ($A_T$) for different pressures inside nozzle 22. As discussed above, nozzle pressures are generally represented by NPR, which, in FIG. 1, is equal to the pressure at nozzle throat 32 ($P_T$) divided by the ambient pressure ($P_{Amb}$), or $NPR=P_T/P_{Amb}$. Therefore, nozzle 22 prescribes $A_E/A_T$ by positioning convergent and divergent flaps 26, 28, as a function of varying values of NPR encountered during operation of engine 10.

Figure 2:
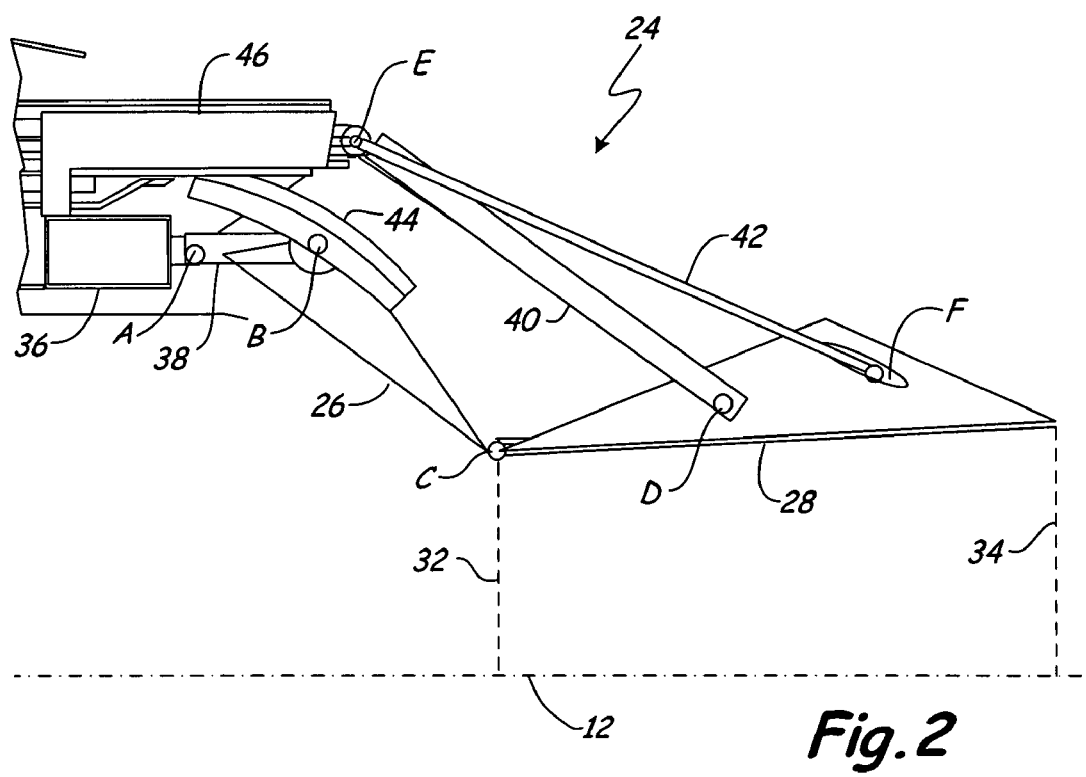
FIG. 2 is a side view of one mechanism included in the convergent-divergent nozzle of FIG. 1.

FIG. 2 is a side view of mechanism 24 included in nozzle 22 of FIG. 1. Mechanism 24 includes convergent flap 26, divergent flap 28, actuator 36, first link 38, second link 40, third link 42, track 44, and sync ring 46. In FIG. 2, actuator 36 is connected to the aft end of engine 10 (shown in FIG. 1). Sync ring 46 is an annular ring arranged about main axis 12 at the aft end of engine 10 and connected to actuator 36. First link 38 is pivotally connected to actuator 36 at pivot point A. Convergent flap 26 is pivotally connected to first link 38 at sliding pivot point B. Track 44 is connected to the aft end of engine 10 between sync ring 38 and actuator 36 and may be, as shown in FIG. 2, generally curved toward main axis 12 of engine 10 as it extends from the aft end of the engine 10. Track 44 movably and pivotally receives the pivotal connection between first link 38 and convergent flap 26 at moving pivot point B. In some embodiments of the present invention, track 44 may include a track configured to receive a roller or slider member configured to roll or slide in the track and to which is pivotally connected first link 38 and convergent flap 26. In FIG. 2, the aft end of convergent flap 26 is rotatably connected to the forward end of divergent flap 28 at which connection point C generally defines nozzle throat 32. Divergent flap 28 is pivotally connected at pivot point D to second link 40 which is pivotally connected to sync ring 46 at pivot point E. Third link 42 is slidably connected to divergent flap 28 at slot F and pivotally connected to sync ring 46 at pivot point E. The aft end of divergent flap 28 generally defines nozzle exit 34.

Mechanism 24 is configured to mechanically prescribe the position of convergent and divergent flaps 26, 28 as a function of NPR. Specifically, mechanism 24 is a kinematic mechanism including the interconnection of convergent flap 26, divergent flap 28, first, second, and third links 38-42, and track 44 and mechanically driven by actuator 36 to which is attached sync ring 46. Actuator 36 is configured to move forward and aftward through one or more positions, which movement of actuator 36 mechanically drives mechanism 24 and thereby positions convergent and divergent flaps 26, 28. The movement of actuator 36 may be controlled to position convergent and divergent flaps 26, 28 for varying values of NPR encountered during operation of engine 10.

Figure 3A:
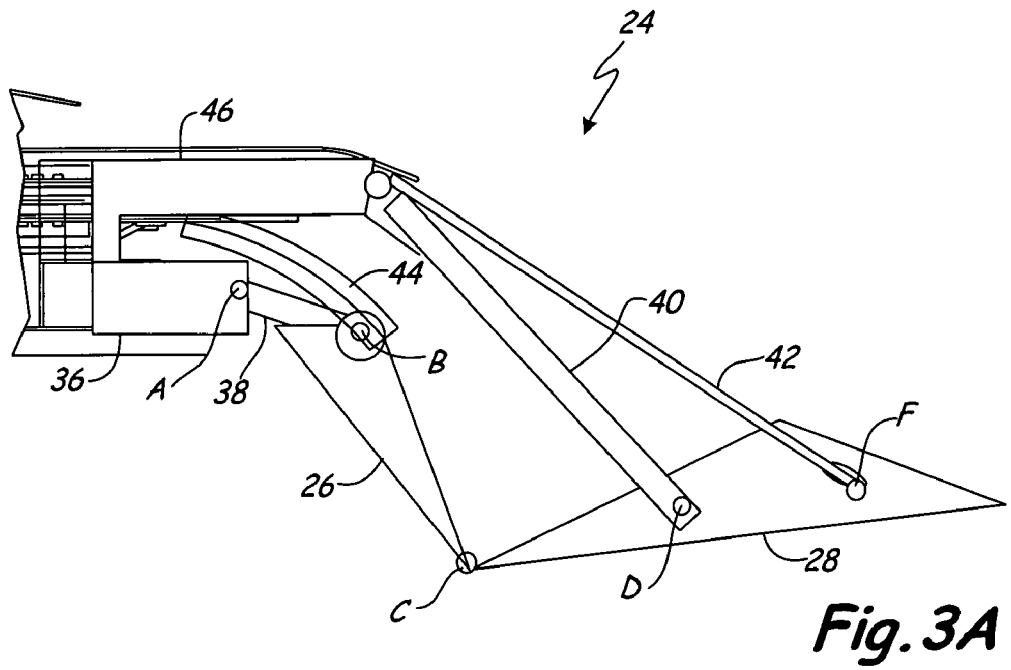
FIGS. 3A and 3B are side views showing the mechanical positioning of the mechanism of FIG. 2 by movement of an actuator.
Figure 3B:
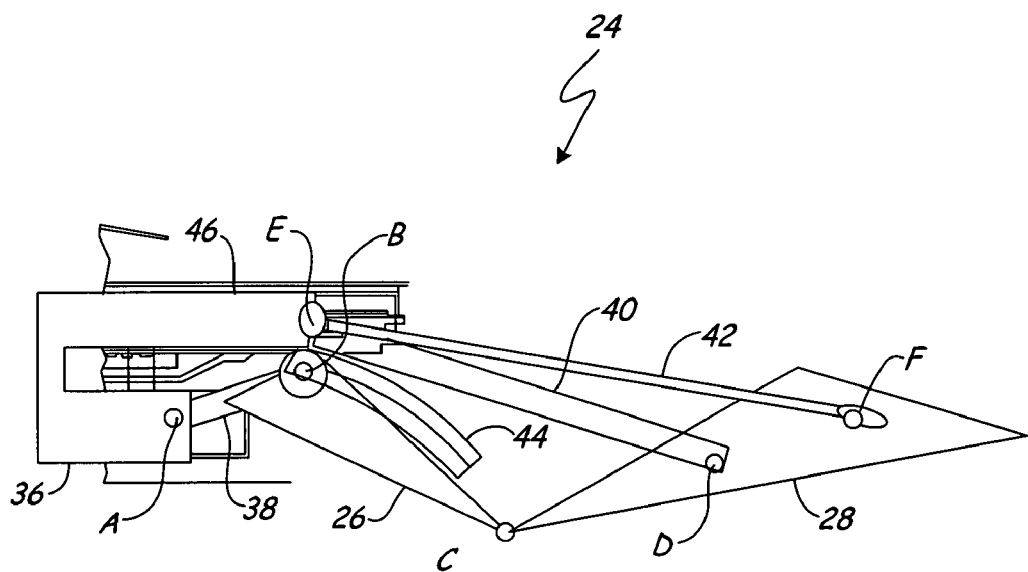

FIGS. 3A and 3B are side views showing the mechanical positioning of mechanism 24 by the movement of actuator 36 to which is connected sync ring 46. The position of mechanism 24 in FIG. 3A may correspond to, for example, high mode and the position of mechanism 24 in FIG. 3B may correspond to, for example, low mode. In FIGS. 3A and 3B, actuator 36 and sync ring 46 move from left to right. As actuator 36 and sync ring 46 move, convergent and divergent flaps 26, 28 are positioned in a first and second position as a result of their interconnection with each other and first, second, and third links 38-42 and track 44. As shown in FIGS. 3A and 3B, track 44 remains substantially fixed as actuator 36 and sync ring 46 move.

Figure 4A:
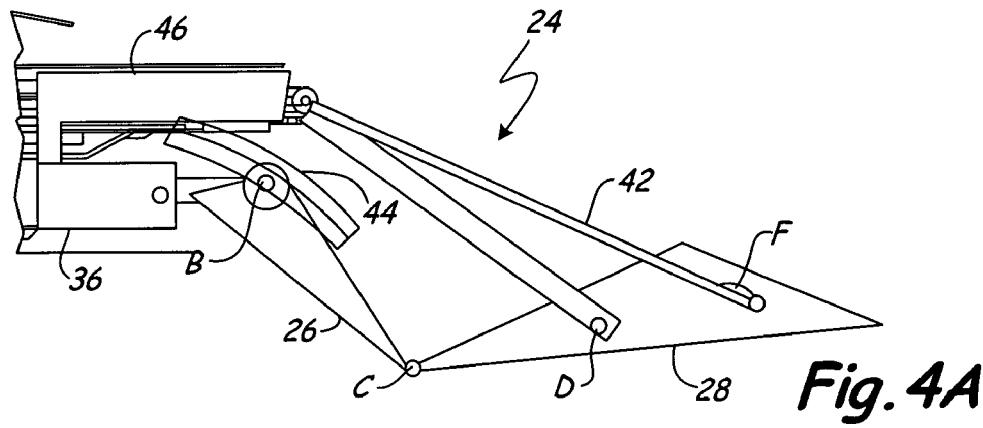
FIGS. 4A-4C are side views showing the aerodynamic positioning of the mechanism of FIGS. 2-3B independent of the movement of an actuator.
Figure 4B:
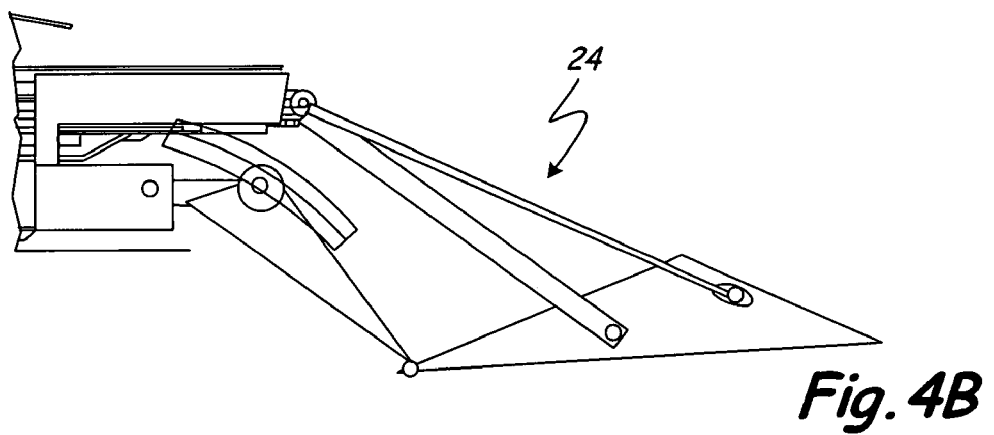
Figure 4C:
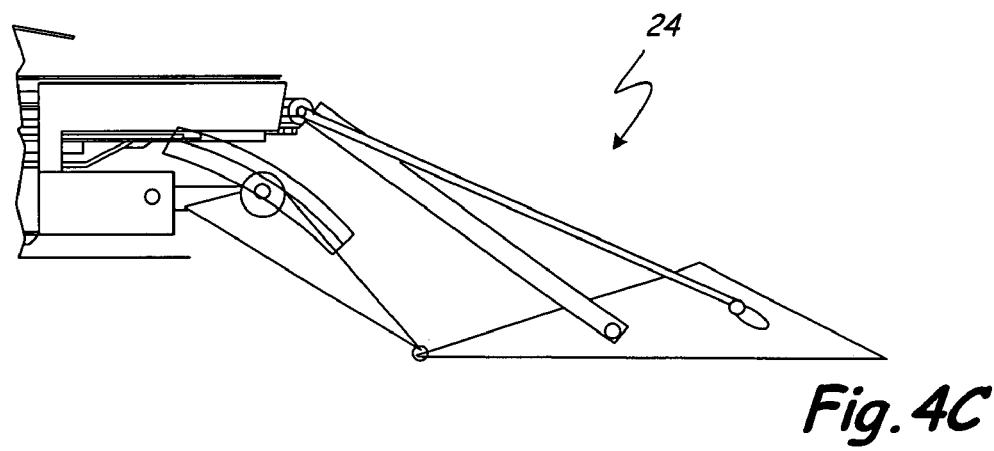

Independent of the movement of actuator 36 and sync ring 46, mechanism 24 is configured to vary the position of convergent and divergent flaps 26, 28 as a function of the gas pressure acting on nozzle 22 during operation of engine 10. FIGS. 4A-4C are side views showing mechanism 24 in three different positions for a single position of actuator 36 to which is attached sync ring 46. In FIGS. 4A-4C, convergent flap 26 is slidably and pivotally connected to track 44 at moving pivot point B. Third link 42 is slidably connected to divergent flap 28 at slot F. The pivotal connection between convergent flap 26 and track 44 is configured to permit convergent flap 26 to rotate about moving pivot point B independent of the mechanical positioning of mechanism 24 by actuator 36. The rotation of convergent flap 26 about point B correspondingly causes movement of divergent flap 28. The sliding connection between third link 42 and divergent flap 28 at slot F is configured to provide a mechanical limit to the rotation of convergent flap 26, and the corresponding movement of divergent flap 28. For example, in FIGS. 4A-4C, the pressure acting on nozzle 22 may change, which in turn may cause convergent flap 26 to react to a force created by the pressure acting on nozzle 22 by rotating about moving pivot point B. The rotation of convergent flap 26 causes divergent flap 28 to rotate about pivot point D. The movement of divergent flap 28, and thereby the rotation of convergent flap 26, is configured with mechanical limits prescribed by the radially inward and outward limits of the sliding connection between divergent flap 28 and third link 42, which limits are illustrated in FIGS. 4A and 4C respectively as third link 42 reaches the radially inward and outward limit of slot F thereby limiting further movement of divergent flap 28.

In operation at a given NPR value, mechanism 24 may mechanically prescribe the position of convergent and divergent flaps 26, 28 by the movement of actuator 36 and the kinematic interconnections of convergent and divergent flaps 26, 28, first, second, and third links 38-42, and track 44. Once the position of convergent and divergent flaps 26, 28 is mechanically prescribed, convergent and divergent flaps 26, 28 may float through a range of positions as the pressure inside nozzle 22 changes and convergent flap 26 rotates about moving pivot point B. Mechanism 24 is also configured to mechanically limit the range of floating positions of convergent and divergent flaps 26, 28. For example, during engine operation at and below an NPR low mode value, the position of convergent and divergent flaps 26, 28 is configured to remain substantially fixed and is mechanically prescribed by the position of actuator 36 and sync ring 46 (see FIG. 3B). Between the NPR low mode value and an NPR high mode value, convergent and divergent flaps 26, 28 are configured to float through a range of positions as the pressure inside nozzle 22 acts to rotate convergent flap 26 about moving pivot point B (see FIGS. 4A-4B). At and above the NPR high mode value, the position of convergent and divergent flaps 26, 28 is configured to remain substantially fixed and is mechanically prescribed by the position of actuator 36 and sync ring 46 (see FIG. 3A). In the embodiment of FIGS. 2-4C, the mechanical limit on the float range of convergent and divergent flaps 26, 28 is provided by third link 42 and the sliding connection between third link 42 and divergent flap 28 at slot F.

Therefore mechanism 24 may be configured to mechanically prescribe the position of convergent flaps 26, 28 at varying NPR values encountered during operation of engine 10. Independent of mechanically prescribing the position of convergent and divergent flaps 26, 28, mechanism 24 may also be configured to float the convergent and divergent flaps 26, 28 through a range of positions as the pressure inside nozzle 22 at values of NPR between high and low modes causes convergent flap 26 to rotate about moving pivot point B. Third link 42 of mechanism 24 may be adjusted for different operating conditions of engine 10 to provide a mechanical limit on the float range of convergent and divergent flaps 26, 28.

Convergent-divergent nozzles and gas turbine engines including convergent-divergent nozzles according to the present invention have several advantages over prior nozzle configurations. Nozzles according to the present invention include a plurality of mechanisms circumferentially arranged about a main axis of the gas turbine engine and configured to mechanically and aerodynamically position convergent and divergent flaps as a function of a gas pressure on the nozzle. Each of the plurality of mechanisms include a convergent flap configured to rotate independent of the position of an actuator. During engine operation, nozzles according to the present invention are configured to provide a float mode between NPR low and high modes in which the position of the convergent and divergent flaps float through a range of positions as a function of the changing pressure on the nozzle. Also, nozzles according to the present invention may be adjusted for varying NPR low to high modal shifts, thereby adjusting nozzle performance for different engine configurations and operating conditions. Nozzles according to the present invention therefore substantially increase engine efficiency and performance over prior nozzle configurations by advantageously positioning the convergent and divergent flaps for a substantially greater number of NPR values encountered during engine operation.

Although the present invention has been described with reference to preferred embodiments, workers skilled in the art will recognize that changes may be made in form and detail without departing from the spirit and scope of the invention.

The invention claimed is:

1. A mechanism included in a convergent-divergent nozzle configured to be connected to an aftward portion of a gas turbine engine, the mechanism comprising:

at least one actuator configured to be connected to the aftward portion of the engine and to move a first coupling point through one or more positions;

an annular ring connected to the at least one actuator, providing to the at least one actuator a second coupling point to move through the one or more positions, the second coupling point being disposed radially outward from the first coupling point and a main axis of the engine;

a first link pivotally connected directly to the first coupling point of the at least one actuator;

a convergent flap pivotally connected to the first link;

a divergent flap rotatably connected to the convergent flap and configured to be kinematically connected to the second coupling point; and at least one track configured to extend from the aftward portion of the engine and which movably and pivotally receives the connection between the convergent flap and the first link.

2. The mechanism of claim 1, wherein the convergent flap is configured to rotate about the connection between the convergent flap, the first link, and the at least one track independent of the one or more positions of the at least one actuator.

3. The mechanism of claim 1, wherein the convergent flap is configured to rotate about the connection between the convergent flap, the first link, and the at least one track through one or more positions as a function of a gas pressure on the nozzle.

4. The mechanism of claim 1 further comprising:

a second link rotatably connected to the divergent flap and pivotally connected directly to the second coupling point; and a third link slidably connected at a first end directly to a slot formed in the divergent flap, and pivotally connected at a second end directly to the second coupling point.

5. The mechanism of claim 4, wherein the sliding connection between the third link and the divergent flap is configured to provide a first limit and a second limit to the one or more positions through which the convergent flap is configured to rotate independent of the one or more positions of the at least one actuator.

6. The mechanism of claim 1, wherein the at least one track is generally curved toward the main axis of the engine as it extends from the aftward portion of the engine.

7. The mechanism of claim 1, wherein the at least one track comprises:

a roller rotatably connected to the convergent flap and the first link; and a track configured to extend from the aftward portion of the engine and to receive the roller.

8. The mechanism of claim 1, wherein the at least one track comprises:

a slider rotatably connected to the convergent flap and the first link; and a track configured to extend from the aftward portion of the engine and to receive the slider.

9. A convergent-divergent nozzle of a gas turbine engine comprising:

a plurality of mechanisms circumferentially connected to an aftward portion of the engine about a main axis of the engine;

a plurality of actuators connected to the aftward portion of the engine, each actuator moving a first coupling point through one or more positions; and an annular ring connected to the plurality of actuators to provide a second coupling point to each actuator;

wherein the plurality of mechanisms each comprise:

a first link pivotally connected directly to the first coupling point of one of the plurality of actuators;

a convergent flap pivotally connected directly to the first link;

a divergent flap rotatably connected to the convergent flap and configured to be kinematically connected by a second and third link to the second coupling point disposed on the annular ring; and a track configured to extend from the aftward portion of the engine and to movably and pivotally receive the entire pivotal connection between the convergent flap and the first link.

10. The nozzle of claim 9, wherein the convergent flap is configured to rotate about the connection between the convergent flap, the first link, and the at least one track independent of the one or more positions of the at least one actuator.

11. The nozzle of claim 9, wherein the convergent flap is configured to rotate about the connection between the convergent flap, the first link, and the at least one track through one or more positions as a function of a gas pressure on the nozzle.

12. The nozzle of claim 9 wherein:
the second link is rotatably connected to the divergent flap and pivotally connected to the second coupling point; and
the third link is slidably connected to the divergent flap and pivotally connected to the second coupling point.

13. The nozzle of claim 12, wherein the sliding connection between the third link and the divergent flap provides a minimum and maximum limit to the one or more positions through which the convergent flap rotates independent of the one or more positions of the at least one actuator.

14. The nozzle of claim 12, wherein the sliding connection between the third link and the divergent flap comprises a slot in the divergent flap configured to receive the third link.

15. The nozzle of claim 9, wherein the at least one track is generally curved toward the main axis of the engine as it extends from the aftward portion of the engine.

16. A gas turbine engine comprising:
convergent-divergent nozzle connected to an aftward portion of the engine, the end nozzle comprising a plurality of mechanisms circumferentially connected to the aftward portion of the engine, and an annular ring arranged about a main axis of the engine and connected to the plurality of mechanisms;
wherein the plurality of mechanisms each comprise:
at least one actuator connected to the aftward portion of the engine and that moves a first coupling point through one or more positions, the annular ring being connected to the at least one actuator, the annular ring thereby providing to the at least one actuator a second coupling point disposed radially outward from the first coupling point with respect to an actuation axis of the actuator;

a first link pivotally connected to the first coupling point of the at least one actuator;

a convergent flap pivotally connected to the first link;

a divergent flap rotatably connected to the convergent flap and directly connected to the second coupling point by a third link; and at least one track connected directly to the aftward portion of the engine that extends from the aftward portion of the engine and immovably and pivotally receives the pivotal connection between the convergent flap and the first link.

17. The engine of claim 16, wherein the convergent flap is configured to rotate about the connection between the convergent flap, the first link, and the at least one track independent of the one or more positions of the at least one actuator as a function of a gas pressure on the nozzle.

18. The engine of claim 16 further comprising:
a second link rotatably connected to the divergent flap and configured to be pivotally connected to the second coupling point; and
the third link is configured to be slidably connected to the divergent flap and configured to be pivotally connected to the second coupling point.

19. The engine of claim 16, wherein the at least one track is generally curved toward the main axis of the engine as it extends from the aftward portion of the engine.

* * * * *

UNITED STATES PATENT AND TRADEMARK OFFICE
CERTIFICATE OF CORRECTION

Page 1 of 1

| | |
|---|---|
| PATENT NO. | : 8,020,386 B2 |
| APPLICATION NO. | : 11/894314 |
| DATED | : September 20, 2011 |
| INVENTOR(S) | : Curtis C. Cowan and Robert H. Bush |

It is certified that error appears in the above-identified patent and that said Letters Patent is hereby corrected as shown below:

IN THE CLAIMS:

Col. 8, Line 22, Claim 16:
  Delete "immovably"
  Insert --movably--

Signed and Sealed this
First Day of November, 2011

David J. Kappos
*Director of the United States Patent and Trademark Office*